(12) United States Patent
Sawada (10) Patent No.: US 6,622,002 B2
(45) Date of Patent: Sep. 16, 2003

(54) IMAGE FORMING APPARATUS HAVING DUPLEX RECORDING FUNCTION

(75) Inventor: Hirohisa Sawada, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/015,605

(22) Filed: Dec. 17, 2001

(65) Prior Publication Data

US 2002/0081133 A1 Jun. 27, 2002

(30) Foreign Application Priority Data

Dec. 25, 2000 (JP) .................................. 2000-392483

(51) Int. Cl.[7] .............................................. G03G 15/00
(52) U.S. Cl. ....................................................... 399/401
(58) Field of Search ........................... 399/81, 306, 309, 399/381, 399, 401

(56) References Cited

U.S. PATENT DOCUMENTS 5,430,468 A    7/1995   Sasai et al. ................. 346/136
5,839,032 A *  11/1998  Yasui et al. ............. 399/401 X
6,026,258 A *  2/2000   Fresk et al. ............... 399/81 X

* cited by examiner

Primary Examiner—Hoan Tran
(74) Attorney, Agent, or Firm—Fitzpatrick, Cella, Harper & Scinto (57) ABSTRACT

A reduced size duplex recording apparatus has a sheet feeding portion arranged in the back of a main body, an image forming portion arranged at the center of the main body, a sheet delivery portion arranged at the front part of the main body, one of an operation portion and an image reading portion arranged in a front upper part of the main body, a surface reverse portion for reversing a transport direction of a sheet on which an image has been recorded, and a re-feed and transporting path for guiding the reversed sheet to the image forming portion, the surface reversing portion being arranged under one of the operation portion and the image reading portion, and the re-feed and transporting path being arranged above the image forming portion and between the sheet feeding portion and one of the operation portion and the image reading portion.

23 Claims, 7 Drawing Sheets

IMAGE FORMING APPARATUS HAVING DUPLEX RECORDING FUNCTION

BACKGROUND OF THE INVENTION

1. Field of the Invention

The present invention relates to an image forming apparatus, such as a copying machine, a printer, a facsimile, and an MFP (multifunction printer), and in particular to an image forming apparatus having a duplex recording function.

2. Description of Related Art

Figure 7:
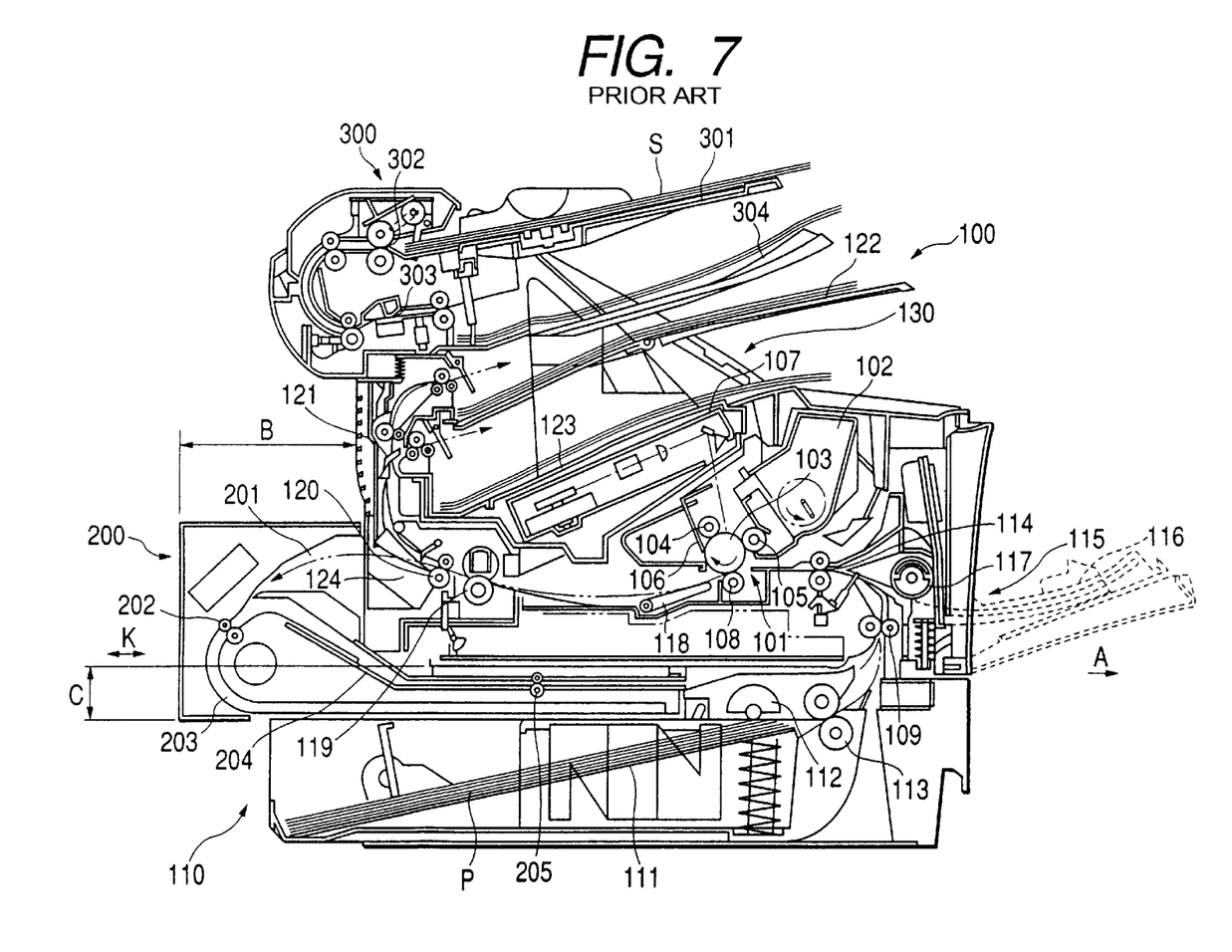
FIG. 7 is an overall construction diagram of a facsimile having a duplex recording function according to a conventional technique.

There have conventionally been proposed various constructions where duplex recording functions are given to image forming apparatuses, such as a copying machine, a printer, and a facsimile. A conventional image forming apparatus will be described by taking a facsimile as an example. FIG. 7 is an overall construction diagram of a facsimile having a duplex recording function according to a conventional technique.

In FIG. 7, the front of the main body of apparatus 100 is rightward in FIG. 7 (in th direction indicated by the arrow A). An image reading portion 300 is provided in the upper part of the apparatus, an image forming portion 101 is provided in the approximately center part thereof, and a sheet feeding portion 110 is provided in the lower part thereof. Also, duplex recording unit 200 including surface reversing means and a re-feed and transporting path is provided between the image forming portion 101 and the sheet feeding portion 110. Further, on the upper surface of the apparatus, there is arranged an operation portion 130 that includes buttons and a display portion that are not shown in FIG. 7.

In the image reading portion 300, an original S stacked on an original stacking tray 301 is fed by a separation roller pair 302. After image information is read by a contact-type image sensor 303, the original S is delivered to an original delivery tray 304. The read image information is transmitted by a communication means (not shown) or is sent to the image forming portion 101, which then records the image information on a sheet.

The image forming portion 101 has a process cartridge 102 that is constructed by integrating a photosensitive drum 103 that is an image bearing member, a charging means 104, a developing means 105, and a cleaning means 106. Also, an optical means 107 is arranged above the process cartridge 102. The optical means 107 irradiates a laser beam onto the photosensitive drum 103, which has been uniformly charged by the charging means 104, according to the image information. In this manner, an electrostatic latent image is formed. The electrostatic latent image is visualized by the developing means 105, thereby forming a toner image. After the toner image is transferred to a fed sheet by a transferring means 108, residual toner on the photosensitive drum 103 is removed by the cleaning means 106.

A sheet is fed from the sheet feeding portion 110 provided in the lower part of the apparatus or from a multi-feeding portion 115 provided in a side part of the apparatus. The sheet feeding portion 110 is capable of stacking and storing sheets on a feeding tray 111 and the sheets are separated and fed by a feeding roller 112 and a separation roller pair 113 one by one. In this manner, each sheet is fed to a registration roller pair 114 on the upstream side of the image forming portion 101. As to the multi-feeding portion 115, sheets are inserted by opening a multi-tray 116 and are fed to the registration roller pair 114 by a multi-separation portion 117.

The registration roller pair 114 transports each sheet in synchronism with the toner image on the photosensitive drum 103. After the toner image is transferred to the sheet by a nip between the photosensitive drum 103 and the transferring means 108, a transporting means 118 transports the sheet to a fixing means 119, which then applies heat and pressure to the sheet. In this manner, the toner image is permanently fixed. The transporting path of the sheet, on which the toner image has been fixed, is switched by a flapper 120. If the image formation is to be finished, the sheet is delivered to the outside of the apparatus. If an image is to be recorded on the second side, the sheet is re-fed to the image forming portion 101 by the duplex recording unit 200.

If the image formation is to be finished, the sheet is delivered to any one of two delivery trays 122 and 123 so that the recording surface faces down (face-down delivery). The delivery trays 122 and 123 are provided between the image forming portion 101 and the image reading portion 300. The selection between the delivery trays 122 and 123 is performed by a flapper 121 according to the control performed for the sheet to be delivered.

If an image is to be recorded on the second side, the sheet is guided by the flapper 120 to the duplex recording unit 200 connected to a back delivery portion 124. The sheet is delivered from the back delivery portion 124 so that the recording surface faces up (face-up delivery), and is transported by a surface reversing roller pair 202 from a duplex transporting path 201 to a surface reverse path 203. Following this, when the trailing edge of the sheet reaches the vicinity of the surface reversing roller pair 202, the transport direction is reversed and the sheet is transported to a re-feed and transporting path 204, with the trailing edge being transported thereto first. Then, the sheet is further transported by a transporting roller pair 205 to a feeding roller pair 109 on the main body side. After an image is recorded on the second side in the same manner as above, the sheet is delivered to the delivery tray 122 or 123.

Here, the duplex recording unit 200 is mountable to and detachable from the main body of the apparatus (in the direction indicated by the double-headed arrow K), which makes it possible for a user to pull out the duplex recording unit 200 to remove a jamming sheet or the like from the duplex recording unit 200.

To perform duplex recording in the manner described above, it is required to reverse a sheet delivered from the main body of the apparatus. Therefore, the surface reverse path 203 having a U-turn shape is formed with the aforementioned conventional construction, which means that the duplex recording unit 200 significantly projects backward from the apparatus. Accordingly, the size of the apparatus is increased by the amount of this projection B. This results in problems that a production cost is increased and an installation space is also increased.

Also, the surface reverse path 203 and the re-feed and transporting path 204 are formed below the image forming portion 101, so that the overall height of the apparatus is also increased by the height C required to form these paths. This increase of the apparatus height results in the increase of a size of the apparatus, which in turn increases a production cost. The increase of the apparatus height also increases the heights of the original stacking tray 301, the original delivery tray 304, the delivery trays 122 and 123, an operation panel of the operation portion 130, and the like. Accordingly, this problem particularly becomes serious in the case of a desktop-type apparatus that is used on a desk.

Meanwhile, as a means for reducing the size of the apparatus, there may be reduced the radius of the U-turn portion; through which a sheet passes when it is fed from the re-feed and transporting path 204 to the feeding roller pair 109 on the apparatus main body side, or there may be reduced the radius of the U-turn portion of the surface reverse path 203. However, if the radius of such U-turn portions are reduced, this increases the resistance that occurs during the transport of a sheet. As a result, there are various adverse effects. For instance, jams tend to occur, particularly when thick sheets are used. Also, the reliability of sheet transportation is reduced and the sheets that are usable are limited to thin sheets.

SUMMARY OF THE INVENTION

In view of these problems, the object of the present invention is to provide a desktop-type image forming apparatus having a duplex recording function, in which the increase of a size of the apparatus is avoided, the operability of an operation portion and a reading portion is improved, an installation space is saved, high reliability is realized, and a jam clearance property is improved.

In order to solve the above-mentioned problems, an image forming apparatus according to the present invention has an exemplary structure, which includes: a sheet feeding portion arranged in a back part of a main body of the apparatus; an image forming portion arranged in an approximately center part of the main body of the apparatus; a sheet delivery portion arranged in a front part of the main body of the apparatus; one of an operation portion and an image reading portion arranged in a front upper part of the main body of the apparatus; a surface reversing means for reversing a transport direction of a sheet on which an image has been recorded; and a re-feed and transporting path for guiding the reversed sheet to the image forming portion, in which the surface reversing means is arranged below one of the operation portion and the image reading portion, and the re-feed and transporting path is arranged between the sheet feeding portion and one of the operation portion and the image reading portion as well as above the image forming portion.

DESCRIPTION OF THE PREFERRED EMBODIMENTS

<First Embodiment>

Figure 1:
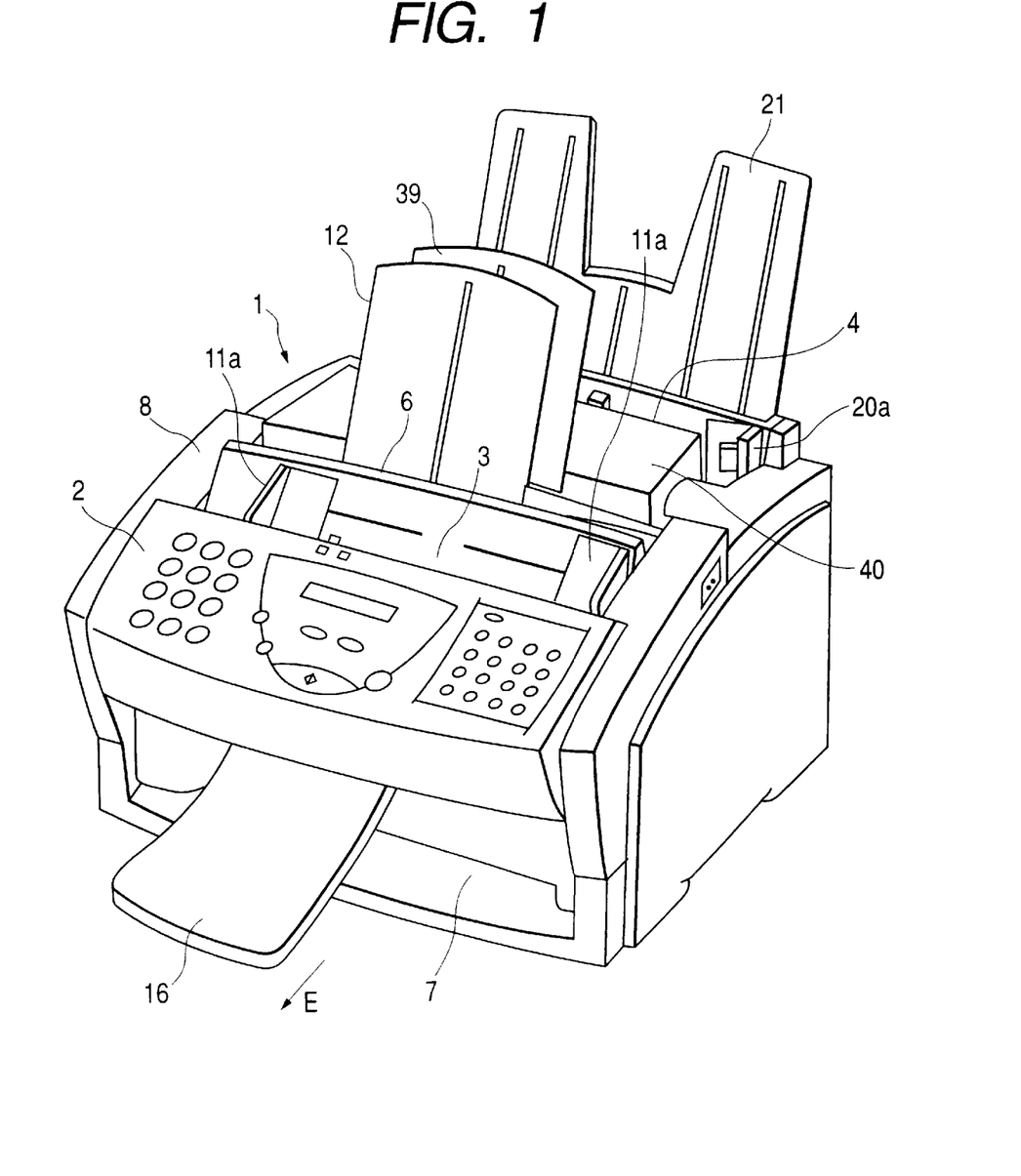
FIG. 1 is an external perspective view of an image forming apparatus according to an embodiment of the present invention.
Figure 2:
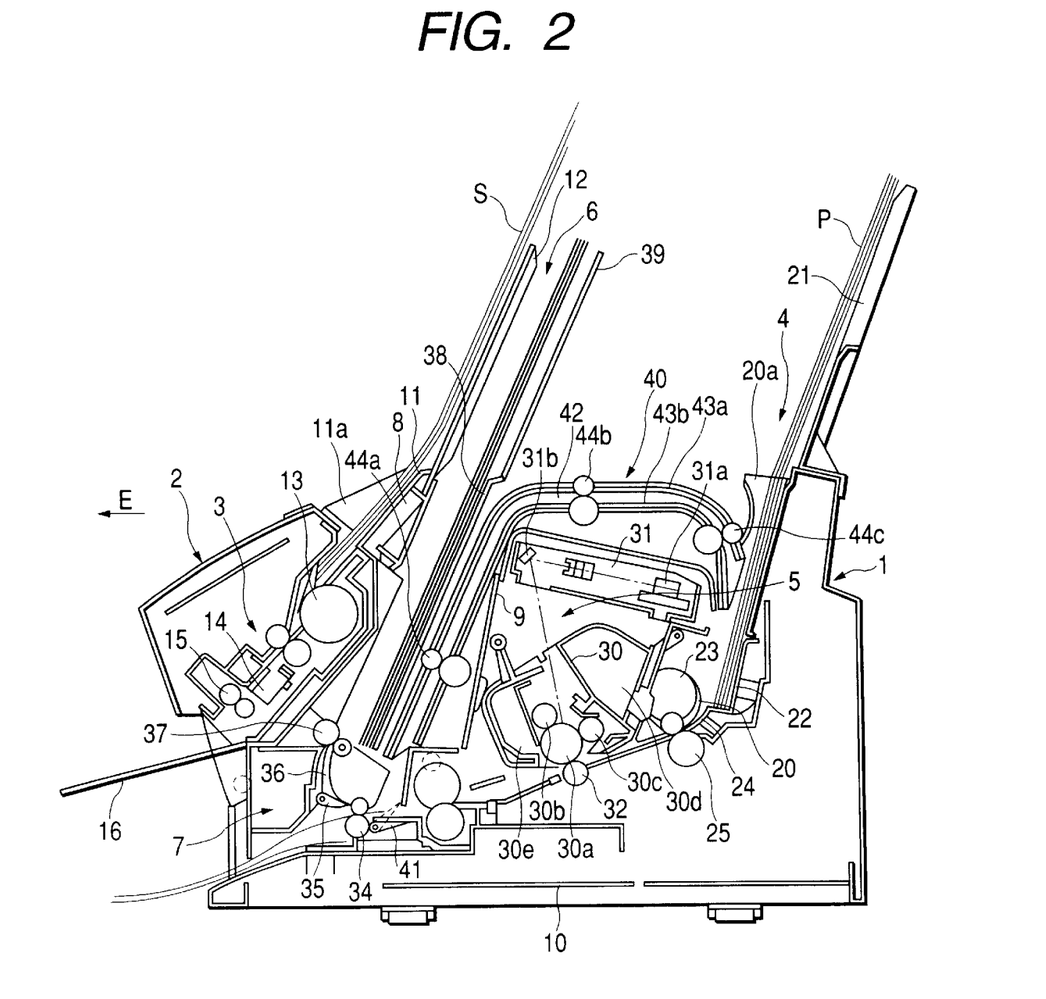
FIG. 2 is an overall construction diagram of the image forming apparatus.
Figure 3:
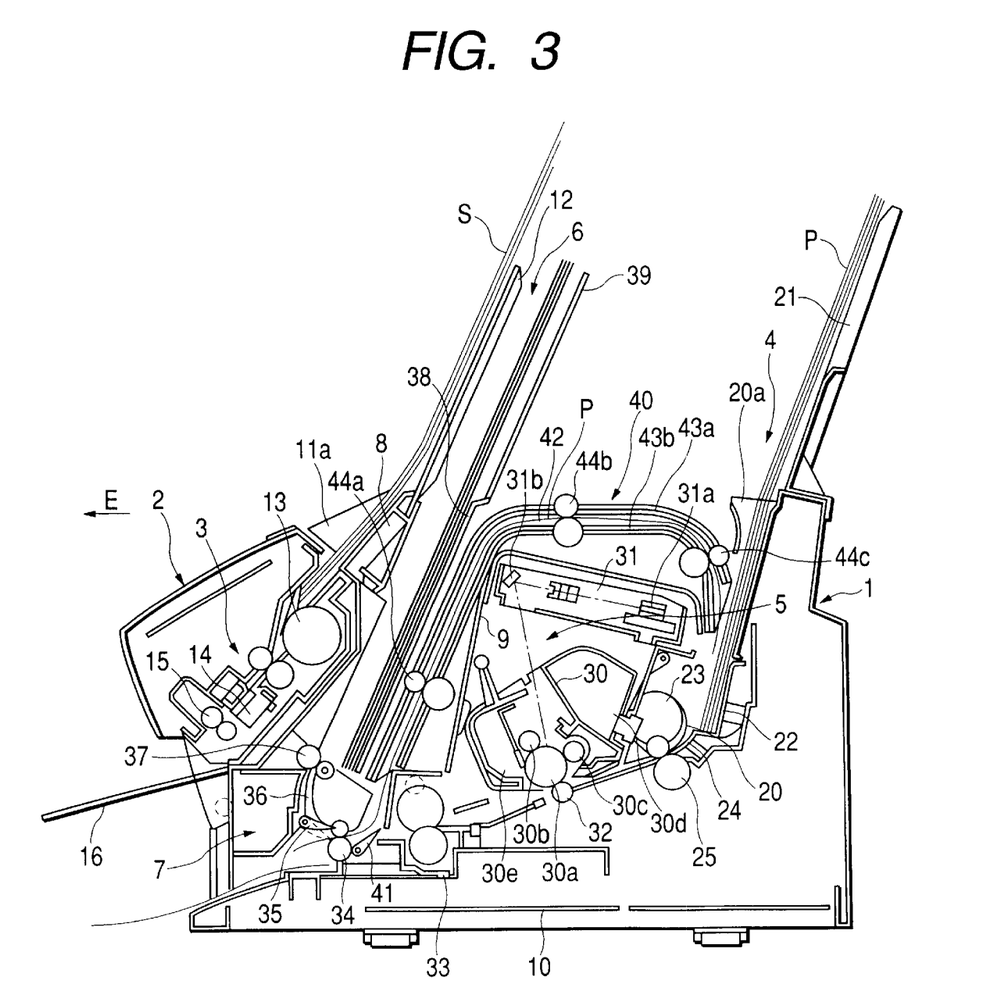
FIG. 3 is an overall construction diagram illustrating a duplex recording operation.
Figure 4:
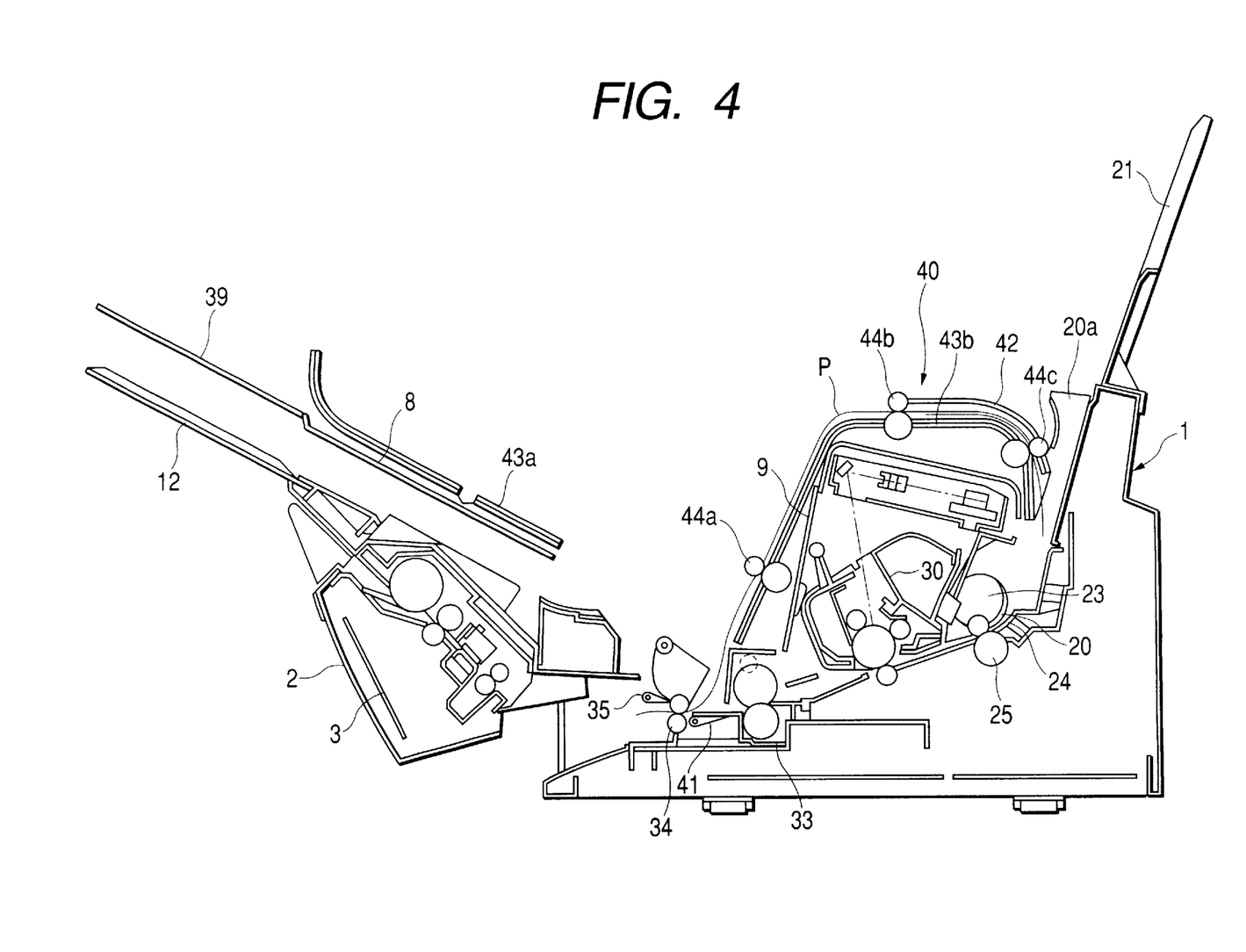
FIG. 4 is a diagram illustrating jam clearance performed in a duplex recording portion.
Figure 5:
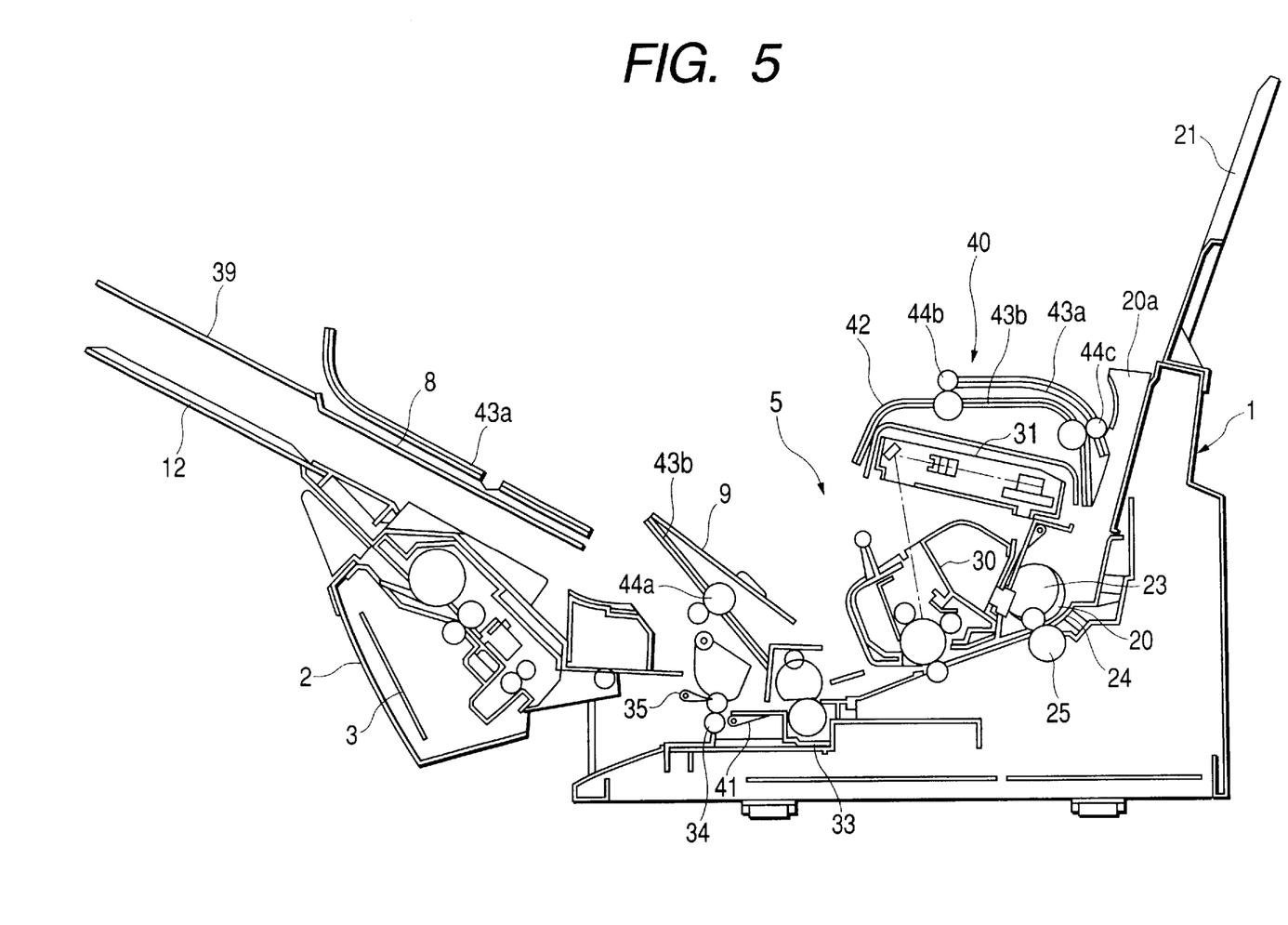
FIG. 5 is a diagram illustrating a state where a cover is opened in order to exchange a process cartridge.
Figure 6:
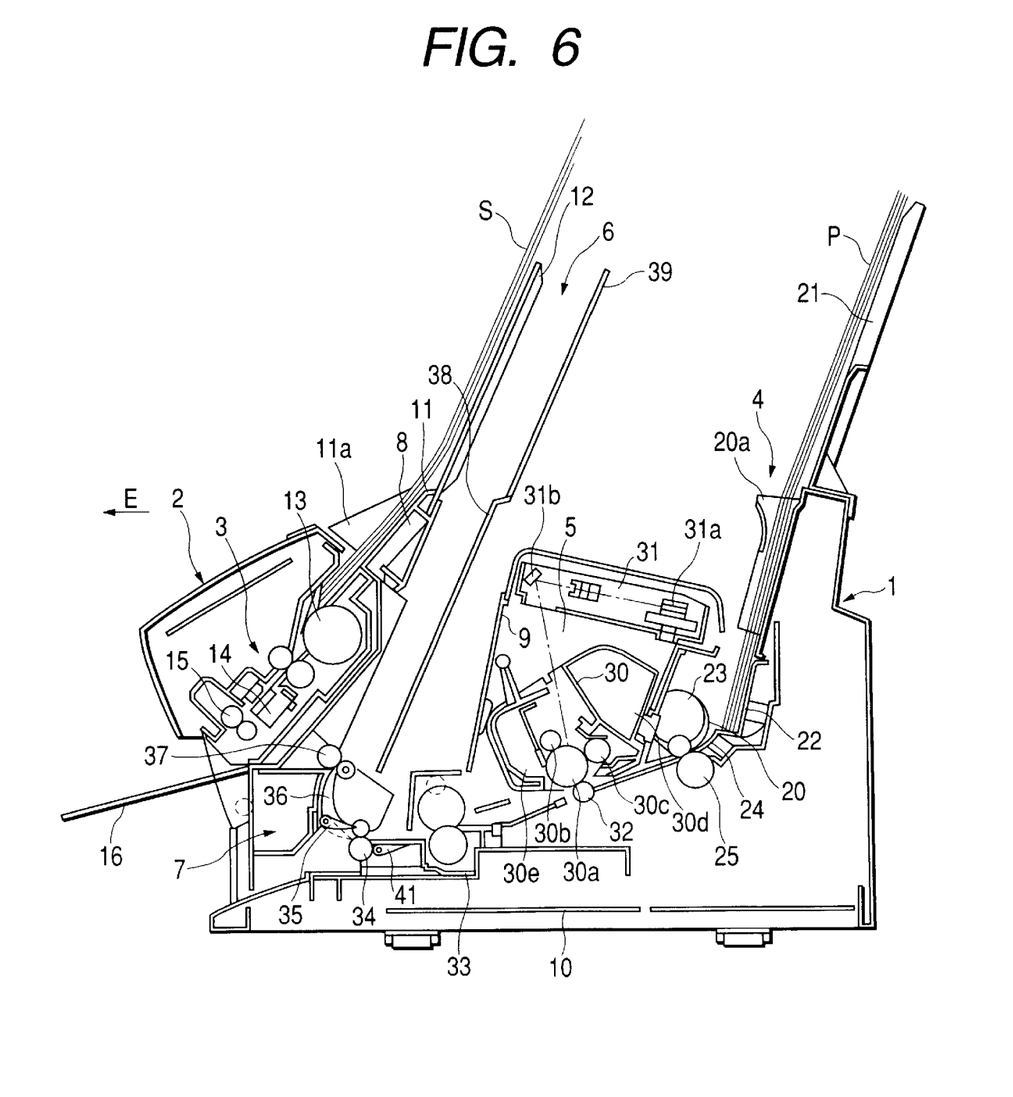
FIG. 6 is a diagram showing a state where a duplex recording unit is detached.

The first embodiment of an image forming apparatus according to the present invention will be described with reference to the accompanying drawings. In the embodiment, the image forming apparatus will be described by taking a facsimile having a duplex recording function as an example. FIG. 1 is an external perspective view of the image forming apparatus according to the embodiment, FIG. 2 is an overall construction diagram of the image forming apparatus, FIG. 3 is an overall construction diagram illustrating a duplex recording operation, FIG. 4 illustrates jam clearance performed in a duplex recording portion, FIG. 5 illustrates a state where a cover is opened in order to exchange a process cartridge, and FIG. 6 shows a state where a duplex recording unit is detached. It should be noted that, unless otherwise specified, there is no intention to limit the scope of the present invention to the sizes, materials, shapes, relative positions, and other aspects of component parts described in the embodiment.

(Overall Construction)

First, the overall construction of the facsimile will be described with reference to FIGS. 1 and 2. As shown in FIG. 1, the front of the main body 1 of an apparatus is directed in the direction indicated by the arrow E, and an operation portion 2 and an image reading portion 3 are provided in a front upper part. Also, a sheet feeding portion 4 is arranged in a back part of the main body 1 of the apparatus, an image forming portion 5 is arranged in the approximately center part thereof (see FIG. 2), a face-down delivery portion 6 and a face-up delivery portion 7 are arranged as a sheet delivery portion in the front part thereof, and a control portion 10 is arranged in the lower part of the apparatus. As to the positional relation between the image reading portion 3 and the image forming portion 5, these portions are laid out so that a delivery opening of the image forming portion is provided at a position in the apparatus that is behind an insertion opening (feeding opening), through which an original S is fed into the image reading portion 3. With this construction, the operability of the image reading portion is improved, which in many cases, starts a reading operation immediately after the original S is stacked.

The operation portion 2 is provided on the upper surface of the image reading portion 3 and includes buttons for performing various operations and a display portion. Also, the operation portion 2 and the image reading portion 3 are attached to a cartridge cover 8 including an original stacking stand 11 and a sheet delivery stand 38 to be described later, and are rotatively constructed with reference to the main body of the apparatus. Also, a cartridge front cover 9, which is opened when a process cartridge 30 is to be detached, is provided inside of the cartridge cover 8.

In the image reading portion 3, an original feeding tray 12 is attached as an extension of the original stacking stand 11 that is integrated with the cartridge cover 8. Also, sliders 11a that are capable of sliding in a direction (the width direction of the original S) that is perpendicular to the direction in which the original S is transported are provided for the original stacking stand 11. The sliders 11a are constructed so as to regulate and align both side ends of originals S stacked on the original stacking stand 11. The originals S stacked on the original stacking stand 11 and the original feeding tray 12 are separated and fed by a separation and feeding roller 13 one by one. After image information is read by a contact-type image sensor 14 that is an image reading means, the original S is delivered by a delivery roller pair 15 to an original delivery tray 16 projecting outside of the apparatus and is stacked thereon.

In the sheet feeding portion 4, a sheet feeding tray 21 is attached as an extension of a sheet stacking stand 20 and side regulating plates 20a for regulating sheets in the width direction of the sheets are provided. Sheets P stacked on the sheet stacking stand 20 are brought into pressure contact with a separation roller 23 by an intermediate plate 22 and are picked up. The picked-up sheets are separated and fed one by one by the separation roller 23 and a separation pad 24 and are transported to the image forming portion 5 by a transport roller pair 25.

The sheets are made of paper or a synthetic resin. In the present embodiment, the sheets that can be stored on the sheet stacking stand 20 are limited to three types: A4-size sheets, letter-sized sheets, and legal-size sheets. Also, the number of sheets that can be stored thereon is set at around a hundred (100).

The image forming portion 5 includes the process cartridge 30, which has a construction as a process portion where a photosensitive drum 30a that is an image bearing member, a charging means 30b, a developing means 30c, a toner tank 30d, and a cleaning means 30e are constructed as a unit. Also, the process cartridge 30 is constructed so as to be mountable to and detachable from the main body of the apparatus. The process cartridge 30 is arranged above a sheet transporting path and an optical means 31 is arranged above the process cartridge 30. The optical means 31 emits a modulation signal from a laser oscillator (not shown) according to an image signal outputted from the control portion 10. The emitted modulation signal is irradiated onto the surface of the photosensitive drum 30a of the process cartridge 30 by a polygon mirror 31a and a return mirror 31b.

The surface of the photosensitive drum 30a is uniformly charged by the charging means 30b. A laser beam is irradiated onto the surface, thereby forming an electrostatic latent image. The electrostatic latent image is visualized by the developing means 30c, thereby forming a toner image. The toner image is formed by adjusting timing so that the leading edge of the sheet P described above is fed in synchronism with the leading edge of the toner image. The toner image is transferred onto the sheet in a nip between the photosensitive drum 30a and a transfer roller 32. The sheet P onto which the toner image has been transferred is processed by a fixing means 33 so that the image is permanently fixed. The sheet P is then selectively delivered by a flapper 35 from a delivery roller pair 34 to the face-down delivery portion 6 or the face-up delivery portion 7. The delivery roller pair 34 functions as a direct delivery means in the face-up delivery portion 7 and also functions as a surface reversing means in a duplex recording mechanism to be described later.

The face-down delivery portion 6 is a delivery portion that delivers a sheet so that recording surface faces down. The sheet P is guided from the delivery roller pair 34 to a guide portion 36 by the flapper 35, is delivered by a delivery roller pair 37 to the sheet delivery stand 38 and the sheet delivery tray 39 attached as an extension of the sheet delivery stand 38, and is stacked thereon. The sheet delivery stand 38 exists at a position immediately behind the image reading portion 3 as well as in front of the image forming portion 5, and the sheet is delivered approximately upward.

The face-up delivery portion 7 is a delivery portion that delivers the sheet so that recording surface faces up. The sheet is delivered from the delivery roller pair 34 directly to the front part of the apparatus. The delivery roller pair 34 exists below the image reading portion and has a height that is close to the installation plane of the main body of the apparatus, so that the leading edge of the delivered sheet P is favorably stacked on the installation plane of the apparatus.

(Duplex Recording Portion)

The duplex recording portion is a portion having a function of re-feeding a sheet to the image forming portion by reversing the sheet, thereby recording an image on the second side of a sheet on whose first side there has been recorded an image. In the present embodiment, the duplex recording portion includes a duplex recording unit 40 having the delivery roller pair 34 that is a surface reversing means and a re-feed and transporting path 42.

In the case where duplex recording is performed, when a sheet, on whose first side there has been recorded an image, comes near to the delivery roller pair 34, the sheet P is first transported by the delivery roller pair 34 from the face-up delivery portion 7 to the outside of the apparatus. Then, when the trailing edge of the sheet P reaches the vicinity of the delivery roller pair 34, the delivery roller pair 34 is rotated in a reverse direction to reverse the direction in which the sheet P is transported. The reversed sheet P is guided to the re-feed and transporting path 42 of the duplex recording unit 40 by switching a flapper 41 provided in the main body of the apparatus (see FIG. 3). Here, the face-up delivery portion 7 is provided in a dead space below the original delivery tray 16 of the image reading portion 3, so that it is not required to newly secure an installation space of the apparatus for the reversal of the sheet P.

In the duplex recording unit 40, the re-feed and transporting path 42 is formed by an outer guide 43a and an inner guide 43b and transport roller pairs 44a, 44b, and 44c are provided midway through the re-feed and transporting path 42. The re-feed and transporting path 42 is arranged between the image reading portion 3 and the sheet feeding portion 4 as well as above the image forming portion 5. As shown in FIG. 3, the sheet P guided to the re-feed and transporting path 42 is re-fed to the image forming portion 5 by the transport roller pairs 44a to 44c and the transport roller pair 25 provided in the main body of the apparatus, thereby recording an image on the second side.

(Jam Clearance in Duplex Recording Portion and Exchange of Process Cartridge)

Next, there will be described a case where sheet jamming occurs during image recording and a case where the sheet transporting path is opened in order to exchange the process cartridge 30 or the like.

As described above, the cartridge cover 8 to which the image reading portion 3 and the like are attached is rotatively attached to the main body of the apparatus and it is possible to open the cartridge cover 8 forward of the apparatus, as shown in FIG. 4. Here, the outer guide 43a of the duplex recording unit 40 is partially connected to the cartridge cover 8 and the re-feed and transporting path 42 is also opened in accordance with the opening of the cartridge cover 8. With this construction, it becomes possible to perform jam clearance for a sheet jammed within the re-feed and transporting path 42 from the front of the apparatus.

Also, as shown in FIG. 5, a part of the inner guide 43b of the duplex recording unit 40 is connected to the cartridge front cover 9 and rotates forward of the apparatus in accordance with the opening of the cartridge front cover 9. With this construction, it becomes possible to exchange the process cartridge 30 within the apparatus from the front of the apparatus and to perform jam clearance in the vicinity of the process cartridge 30 from the front of the apparatus.

An interlock switch (not shown) is provided for the main body of the apparatus to detect whether the cartridge cover 8 and the cartridge front cover 9 are opened or closed. In this manner, there is obtained a construction where the operation of the image forming unit 5 is prohibited while the cartridge over 8 and the cartridge front cover 9 are being opened. Also, there is provided a laser shutter (not shown) for the optical means 31. The laser shutter is closed and opened in synchronism with the opening and closing of the cartridge front cover 9. In this manner, there is obtained a construction where a situation is prevented in which a laser beam enters eyes of a user while the cartridge front cover 9 is being opened.

With the construction described above, it becomes possible to perform, from the front of the apparatus, all of the jam clearance in the duplex recording portion, the exchange of the process cartridge 30, and the jam clearance in the main body of the apparatus. As a result, there is improved operability. Also, the cartridge cover 8 and the cartridge front cover 9 are both opened forward of the apparatus, so that it is not required to secure a work space on a side or at the back of the main body of the apparatus and it becomes unnecessary to increase an installation space.

Also, there is obtained a construction where the optical means 31 and the process cartridge 30 that is a process portion are surrounded by the duplex recording unit 40, so that it becomes possible to increase the radius of the U-turn portion of the re-feed and transporting path 42 without providing a dead space and to favorably transport even thick sheets by reducing transport resistance.

(Attachment and Detachment of Duplex Recording Portion)

Next, attachment and detachment of the duplex recording portion will be described with reference to FIG. 6. In many cases, the duplex recording function is provided as an optional function that is additionally used. Therefore, it is highly demanded to construct the duplex recording-function in a detachably mountable manner.

In the present embodiment, there is obtained a construction described below. Under a condition where only the main body is used and the duplex recording unit 40 is detached as shown in FIG. 6, the duplex recording portion is formed merely by attaching the duplex recording unit 40 to the main body of the apparatus from above of the apparatus.

That is, it is not required to secure an installation space for attaching the duplex recording unit 40 to the solely used main body, and the size and production cost of the apparatus are not increased. Also, the duplex recording unit 40 is attached from above of the apparatus, so that favorable operability is obtained and a space for detaching the duplex recording unit 40 is not required.

Further, the duplex recording unit 40 is arranged between the image reading unit 3 and the sheet feeding unit 4, so that the detachment and attachment of the duplex recording unit 40 does not change the heights of the image reading portion 3 and the operation portion 2 and does not significantly affect operability during usage. As a result, the image forming apparatus of the present embodiment is suitable as a desktop-type apparatus that is used on a desk.

<Second Embodiment>

Next, the second embodiment of the image forming apparatus according to the present invention will be described. The aspects that are the same as those described in the aforementioned first embodiment are given with the same reference numerals and are not described again in connection with the present embodiment. In the aforementioned first embodiment, there has been shown a construction where sheet reversal is performed in the face-up delivery portion 7. The present embodiment, however, relates to case where the sheet reversal is performed in the face-down delivery portion 6.

When a sheet, on whose first side there has been formed an image, comes near to the delivery roller pair 34, the flapper 35 is rotated and guides the sheet to the guide portion 36. Then, the sheet is transported from the delivery roller pair 37 onto the sheet delivery stand 38. Following this, when the trailing edge of the sheet P reaches the vicinity of the delivery roller pair 34, the delivery roller pairs 34 and 37 are rotated in a reverse direction, thereby reversing a transportation direction. Then, in the same manner as in the aforementioned first embodiment, the sheet is guided to the re-feed and transporting path 42 by the flapper 41 and an image is recorded on the second side.

By performing the sheet reversal using the face-down delivery portion 6 in this manner, the sheet protrudes upward from the apparatus and a space other than the installation area for the apparatus is not required. Therefore, the present embodiment is particularly effective in the case of long-sized sheets. Note that the guide portion 36 has a U-turn shape to perform face-down delivery, so that there is a possibility that transport resistance is increased. Therefore, in the case of thick paper, it is effective to perform the sheet reversal using the face-up delivery portion 7.

<Third Embodiment>

Next, the third embodiment of the image forming apparatus according to the present invention will be described. In the aforementioned first embodiment, an electrophotographic method is employed as a recording method, so that there has been shown a construction where the optical means 31 and the process cartridge 30 as the process portion are surrounded by the re-feed and transporting path 42. Even if another recording method is employed, however, with a similar construction where the image forming portion is surrounded, it becomes possible to form the re-feed and transporting path 42 whose U-turn portion has a large radius, which saves the installation space. In the case where the other recording method is an ink jet recording method, for instance, an ink tank, a recording head, and the like correspond to the image forming portion.

With the constructions described above, in the image forming apparatus according to the present invention, the sheet reversal is performed by having the leading edge of a sheet temporality protrude in a space in front of the apparatus. As a result, the surface reverse path for duplex recording does not project outside of the apparatus and the installation space for the main body of the apparatus is not increased. Also, the re-feed and transporting path exists between the operation portion and the sheet feeding portion or between the image reading portion and the sheet feeding portion. Therefore, even if the re-feed and transporting path is provided, the height of the operation portion or the image reading portion is not increased and the operability of the apparatus is not affected. Also, the re-feed and transporting path is arranged in the upper part of the apparatus, so that it is easy to perform jam clearance. In addition, in the case where the duplex recording function is provided as an optional function, the size of the main body of the apparatus is not increased under a condition where only the main body is used. Also, it is easy to attach the duplex recording function.

Also, the surface reversing means is constructed using the sheet delivery portion, so that it becomes possible to use an already-existing transporting means as the surface reversing means and to provide the surface reversing means at low cost. Also, the sheet reversal is performed in a space in which sheets are delivered and stacked, so that it is not required to newly secure a space for the sheet reversal and it becomes possible to reduce the size of the apparatus.

Also, the re-feed and transporting path is arranged so that the image forming portion is surrounded by the re-feed and transporting path. As a result, it becomes possible to increase the radius of the U-turn portion without increasing the installation area. As a result, even in the case of thick paper, it becomes possible to reduce transport resistance and to favorably transport the paper.

Also, the reversal operation is performed by having a sheet protrude on the installation plane of the main body of the apparatus, so that it is not required to provide a tray for the reversal and it becomes possible to perform the reversal in a space below the image reading portion. This makes it possible to reduce the production cost and to prevent the increase of the installation space.

What is claimed is:

1. An image forming apparatus comprising:
    a sheet feeding portion arranged in a back part of a main body of said apparatus;
    an image forming portion arranged in an approximately center part of said main body of said apparatus;
    a sheet delivery portion arranged in a front part of said main body of said apparatus;
    one of an operation portion and an image reading portion arranged in a front upper part of said main body of said apparatus;
    surface reversing means for reversing a transport direction of a sheet on which an image has been formed by said image forming portion; and
    a re-feed and transporting path for guiding the reversed sheet to said image forming portion,
    wherein said surface reversing means is arranged below one of said operation portion and said image reading portion, and
    said re-feed and transporting path is arranged between said sheet feeding portion and said one of said operation portion and said image reading portion as well as above said image forming portion.

2. An image forming apparatus according to claim 1, wherein said image forming portion employs an electrophotographic method and includes a process portion and optical means, said process portion including an image bearing member, charging unit, and developing unit, and said optical means being for irradiating a laser beam onto said image bearing member, and wherein said re-feed and transporting path is arranged so that said process portion and said optical means are surrounded by said re-feed and transporting path.

3. An image forming apparatus according to claim 1, wherein said surface reversing means is provided in said sheet delivery portion.

4. An image forming apparatus according to claim 3, wherein said sheet delivery portion has a height that is close to an installation plane of said main body of said apparatus, and wherein said surface reversing means performs a reverse operation by having the sheet protrude on the installation plane outside of said apparatus.

5. An image forming apparatus comprising:
    a feeding portion for feeding a sheet;
    image forming means for forming an image on the sheet fed by said feeding portion;
    delivery means for delivering the sheet on which the image has been formed by said image forming means;
    reading means for reading an image on an original;
    a re-feed and transporting path for passing the sheet, on which the image has been formed by said image forming means, between said image forming means and said reading means to guide the sheet to said image forming means again; and
    switchback means for switching back the sheet to be guided by said re-feed and transporting path,
    wherein said delivery means serves as said switchback means.

6. An image forming apparatus according to claim 5, wherein said re-feed and transporting path guides the sheet so that the sheet passes above said image forming means.

7. An image forming apparatus according to claim 5, wherein said reading means is movably supported to allow opening of said re-feed and transporting path.

8. An image forming apparatus according to claim 5, wherein said re-feed and transporting path guides the sheet to said feeding portion to guide the sheet to said image forming means again.

9. An image forming apparatus according to claim 5, wherein said delivery means delivers the sheet between said reading means and said re-feed and transporting path.

10. An image forming apparatus according to claim 5, further comprising:
    an operation portion for operating said apparatus, said operation portion being provided above said reading means.

11. An image forming apparatus according to claim 5, wherein said reading means is arranged in a front part of said apparatus.

12. An image forming apparatus according to claim 11, wherein said feeding portion is arranged in a back part of said apparatus and supports the sheet in a slanting manner so that the sheet is fed from above to below.

13. An image forming apparatus comprising:
    a feeding portion for feeding a sheet;
    image forming means for forming an image on the sheet fed by said feeding portion;
    delivery means for delivering the sheet on which the image has been formed by said image forming means;
    an operation portion for operating said apparatus;
    a re-feed and transporting path for passing the sheet, on which the image has been formed by said image forming means, between said image forming means and said operation portion to guide the sheet to said image forming means again; and
    switchback means for switching back the sheet to be guided by said re-feed and transporting path,
    wherein said delivery means serves as said switchback means.

14. An image forming apparatus according to claim 13, wherein said re-feed and transporting path guides the sheet so that the sheet passes above said image forming means.

15. An image forming apparatus according to claim 13, wherein said operation portion is movably supported to allow opening of said re-feed and transporting path.

16. An image forming apparatus according to claim 13, wherein said re-feed and transporting path guides the sheet to said feeding means to guide the sheet to said image forming means again.

17. An image forming apparatus according to claim 13, wherein said delivery means delivers the sheets between said operation portion and said re-feed and transporting path.

18. An image forming apparatus according to claim 13, wherein said operation portion is arranged in a front part of said apparatus.

19. An image forming apparatus according to claim 18, wherein said feeding portion is arranged in a back part of said apparatus and supports the sheet in a slanting manner so that the sheet is fed from above to below.

20. An image forming apparatus comprising:
    a feeder for feeding a sheet;
    an image forming portion for forming an image on the sheet fed by said feeder;

a reader for reading an image on an original;

a discharge portion for discharging the sheet on which the image has been formed by said image forming portion; and a re-feed and transporting path for passing the sheet, on which the image has been formed by said image forming portion, between said image forming portion and said reader to guide the sheet to said image forming portion again, wherein said re-feed and transporting path is arranged so that said image forming portion is surrounded by said re-feed and transporting path.

21. An image forming apparatus comprising:

a feeder for feeding a sheet;

an image forming portion for forming an image on the sheet fed by said feeder;

an operation portion for operating said apparatus;

a discharge portion for discharging the sheet on which the image has been formed by said image forming portion; and a re-feed and transporting path for passing the sheet, on which the image has been formed by said image forming portion, between said image forming portion and said operation portion to guide the sheet to said image forming portion again, wherein said re-feed and transporting path is arranged so that said image forming portion is surrounded by said re-feed and transporting path.

22. An image forming apparatus comprising:

a feeder for feeding a sheet;

an image forming portion for forming an image on the sheet fed by said feeder;

a reader for reading an image on an original;

a discharge portion for discharging the sheet on which the image has been formed by said image forming portion; and a re-feed and transporting path for passing the sheet, on which the image has been formed by said image forming portion, between said image forming portion and said reader to guide the sheet to said image forming portion again, wherein said re-feed and transporting path is arranged so that said image forming portion and said reader are separated from each other by said re-feed and transporting path.

23. An image forming apparatus comprising:

a feeder for feeding a sheet;

an image forming portion for forming an image on the sheet fed by said feeder;

an operation portion for operating said apparatus;

a discharge portion for discharging the sheet on which the image has been formed by said image forming portion; and a re-feed and transporting path for passing the sheet, on which the image has been formed by said image forming portion, between said image forming portion and said operation portion to guide the sheet to said image forming portion again, wherein said re-feed and transporting path is arranged so that said image forming portion and said operation portion are separated from each other by said re-feed and transporting path.

* * * * *

UNITED STATES PATENT AND TRADEMARK OFFICE
CERTIFICATE OF CORRECTION

PATENT NO. : 6,622,002 B2  Page 1 of 1
DATED : September 16, 2003
INVENTOR(S) : Hirohisa Sawada It is certified that error appears in the above-identified patent and that said Letters Patent is hereby corrected as shown below:

<u>Column 1,</u>
Line 22, "th" should read -- the --.

Signed and Sealed this

Third Day of February, 2004

JON W. DUDAS
*Acting Director of the United States Patent and Trademark Office*